(12) United States Patent
Chiu et al.

(10) Patent No.: US 11,662,623 B2
(45) Date of Patent: May 30, 2023

(54) BACKLIGHT MODULE AND FABRICATION METHOD OF LIGHT GUIDE PLATE

(71) Applicant: Darwin Precisions Corporation, Hsinchu County (TW)

(72) Inventors: Yu-Huan Chiu, Hsinchu County (TW); Chien-Wei Liao, Hsinchu County (TW); Yen-Lung Chen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 20 days.

(21) Appl. No.: 17/394,449

(22) Filed: Aug. 5, 2021

(65) Prior Publication Data
US 2022/0187658 A1    Jun. 16, 2022

(30) Foreign Application Priority Data
Dec. 11, 2020 (TW) .................... 109143966

(51) Int. Cl.
*G02F 1/00* (2006.01)
*G02F 1/13357* (2006.01)
*F21V 8/00* (2006.01)

(52) U.S. Cl.
CPC ..... *G02F 1/133603* (2013.01); *G02B 6/0065* (2013.01); *G02F 1/133606* (2013.01)

(58) Field of Classification Search
CPC ................ G02F 1/133603; G02F 1/133606
See application file for complete search history.

(56) References Cited

U.S. PATENT DOCUMENTS

| 10,859,751 B1 | 12/2020 | Chiu et al. | |
| 2012/0188792 A1* | 7/2012 | Matsumoto | G02B 6/0036 362/621 |
| 2013/0057807 A1* | 3/2013 | Goto | G02B 6/0038 362/606 |
| 2013/0094243 A1* | 4/2013 | Wu | G02B 6/0065 29/527.2 |

(Continued)

FOREIGN PATENT DOCUMENTS

| CN | 103424801 A | 12/2013 |
| CN | 111198415 A | 5/2020 |

(Continued)

*Primary Examiner* — Gerald J Sufleta, II
(74) *Attorney, Agent, or Firm* — WPAT, P.C.

(57) ABSTRACT

The present disclosure provides a backlight module including a plurality of light-emitting elements and a light guide plate, in which the light guide plate includes a light-emitting surface, a bottom surface opposite to the light-emitting surface, and a light-incident side connecting the light-emitting surface and the bottom surface. The light-emitting elements are disposed at the light-incident side along a first direction, and the light-emitting surface includes a first region near the light-incident side. The light guide plate includes a plurality of columns extending along the first direction and disposed in the first region of the light-emitting surface and a plurality of microstructure groups, in which each microstructure group includes a plurality of microstructures arranged along a second direction different from the first direction, and each microstructure connects the adjacent two of the columns.

10 Claims, 17 Drawing Sheets

200

(56) References Cited

U.S. PATENT DOCUMENTS

| | | | |
|---|---|---|---|
| 2020/0103585 A1* | 4/2020 | Weng | G02B 6/0038 |
| 2020/0225403 A1* | 7/2020 | Chang | G02B 6/0038 |
| 2021/0063629 A1* | 3/2021 | Chiu | G02B 6/0036 |

FOREIGN PATENT DOCUMENTS

| | | |
|---|---|---|
| TW | I400496 B1 | 7/2013 |
| TW | I559040 B | 11/2016 |
| TW | 202020521 A | 6/2020 |

\* cited by examiner

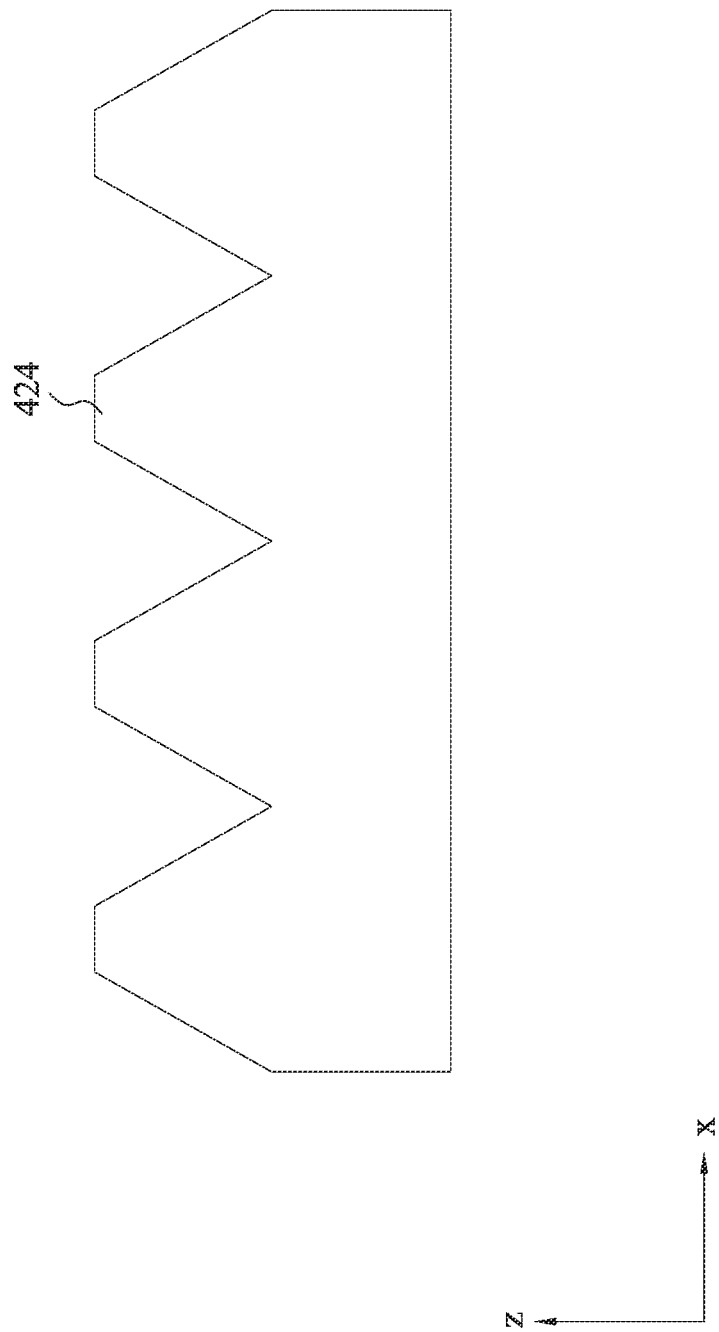

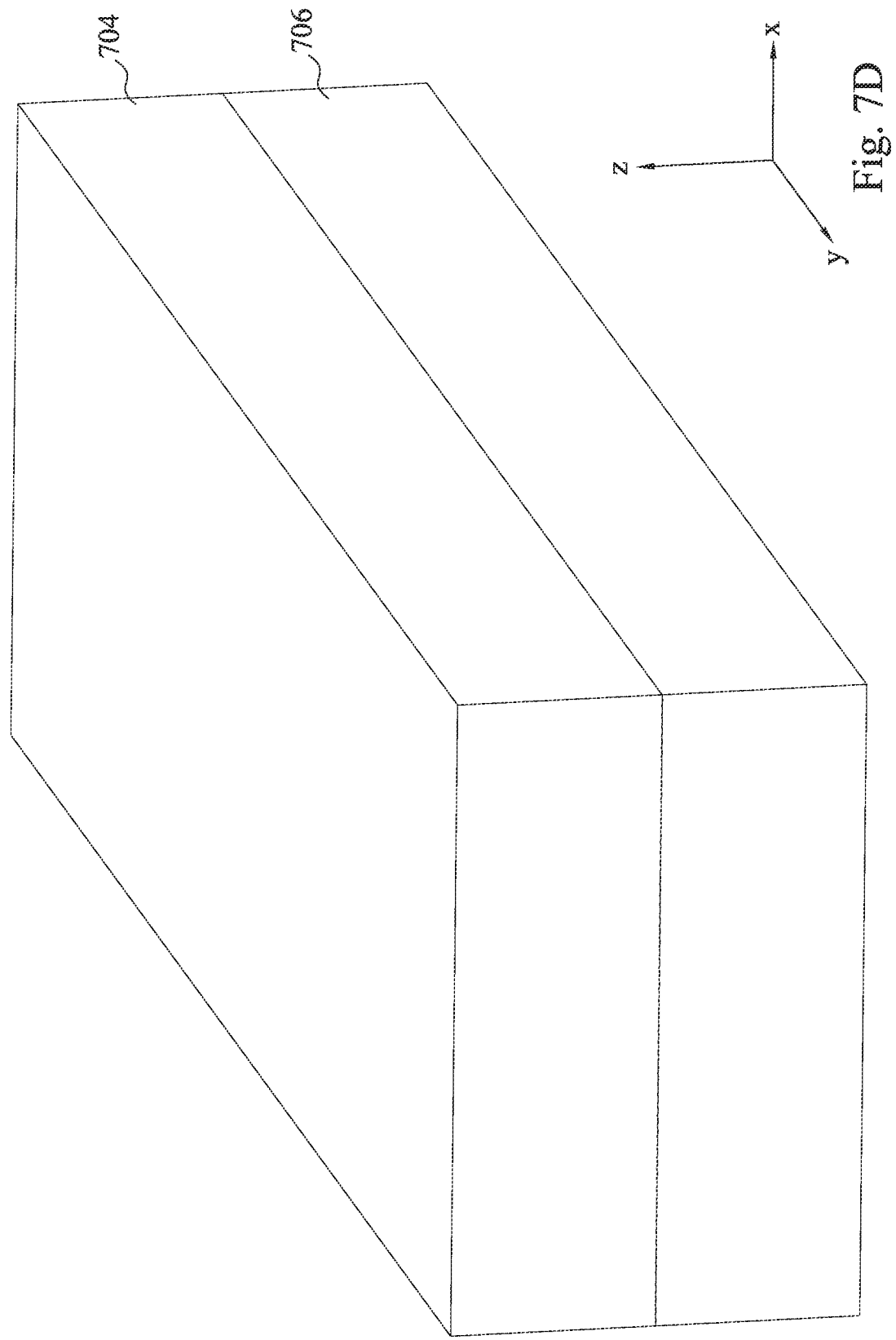

BACKLIGHT MODULE AND FABRICATION METHOD OF LIGHT GUIDE PLATE

CROSS-REFERENCE TO RELATED APPLICATION

This application claims priority to Taiwan Application Serial Number 109143966, filed on Dec. 11, 2020, which is herein incorporated by reference in its entirety.

BACKGROUND

Field of Invention

The present disclosure relates to the display device. More particularly, the present disclosure relates to the backlight module of the display device and the fabrication method of the light guide plate.

Description of Related Art

The liquid crystal display (LCD) generally includes the liquid crystal module and the backlight module for the light source. The light provided by the light-emitting element in the backlight module is guided by the reflector, the light guide plate, the optical film layer, and other elements in the backlight module so that the backlight module may provide the light source to the entirety of the liquid crystal module. Therefore, the luminance uniformity of the backlight module would affect the optical performance of the LCD.

SUMMARY

The present disclosure provides a backlight module including a plurality of first light-emitting elements and a light guide plate, in which the light guide plate includes a light-emitting surface, a bottom surface opposite to the light-emitting surface, and a first light-incident side connecting the light-emitting surface and the bottom surface. The first light-emitting elements are disposed at the first light-incident side along a first direction, and the light-emitting surface includes a first region near the first light-incident side. The light guide plate includes a plurality of first columns extending along the first direction and disposed in the first region of the light-emitting surface and a plurality of first microstructure groups disposed in the first region, in which each first microstructure group includes a plurality of first microstructures arranged along a second direction different from the first direction, and each first microstructure connects the adjacent two of the first columns.

The present disclosure provides a fabrication method of the light guide plate which includes providing a first substrate with a processing plane, forming a plurality of first mold trenches along a second direction and connecting to each other on the processing plane by a first cutter, forming a plurality of second mold trenches along a first direction different from the second direction in a first processing region on the processing plane by a second cutter, and fabricating a light-emitting surface of the light guide plate by rolling over with the processing plane, in which the first processing region is near a first edge of the processing plane.

In the backlight module provide by the present disclosure, the dark band and the hotspot of the light-emitting surface of the light guide plate may be eliminated by the columns and the microstructure groups near the light-incident side on the light-emitting surface of the light guide plate, which may uniform the surface source of the light guide plate, reduce the thickness of the light guide plate, and provide improved optical performance.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows. Aspects of the present disclosure are best understood from the following detailed description when read with the accompanying figures. It is noted that, in accordance with the standard practice in the industry, various features are not drawn to scale.

FIGS. 4A-4D illustrate cross-sectional views of the light guide plates according to some embodiments of this disclosure.

FIGS. 7A-7E illustrate cross-sectional views of forming the light guide plate at fabrication stages according to some embodiments of this disclosure.

DETAILED DESCRIPTION

Figure 1:
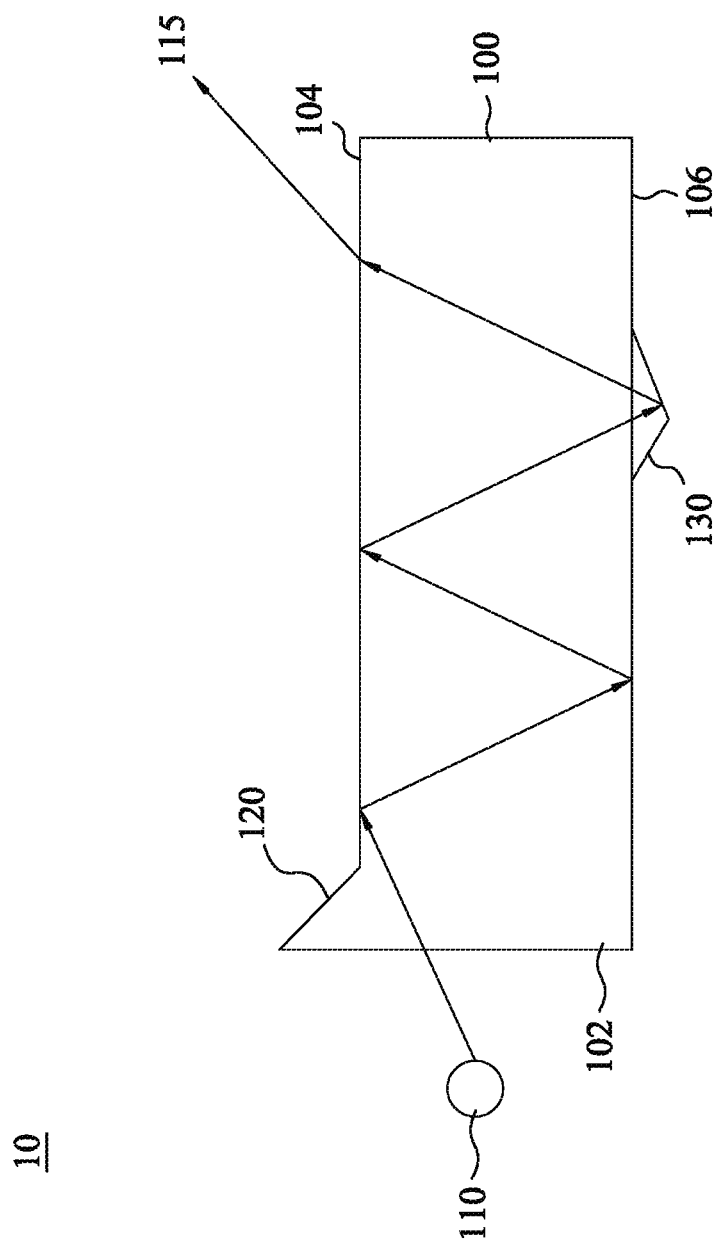
FIG. 1 illustrates a cross-sectional view of a backlight module according to some embodiments of this disclosure.

The following disclosure provides many different embodiments, or examples, for implementing different features of the provided subject matter. Specific examples of components, values, arrangements, etc., are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, reference will now be made in detail to the present embodiments of the disclosure, examples of which are illustrated in the accompanying drawings. Wherever possible, the same reference numbers are used in the drawings and the description to refer to the same or like parts.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The light guide plate in the backlight module generally includes microstructures on the upper surface or the lower surface, which may uniform the light from the light-emitting element to provide the surface source of the display device. FIG. 1 illustrates a cross-sectional view of a backlight module 10. In FIG. 1, the backlight module 10 includes a light guide plate 100 and a light-emitting element 110 on the side of the light guide plate 100. However, it should be understood that in the embodiments of the present disclosure, the backlight module 10 may include other materials of layers or components, and the components of the backlight module 10 may be arranged in other manners.

In some embodiments, the light-emitting element 110 may be disposed on the side of the light guide plate 100, and the side surface of the light guide plate 100 facing the light-emitting element 110 is referred as the light-incident side 102. For example, the light-emitting element 110 may include light emitting diode (LED). In these embodiments, the backlight module 10 may also be referred as the edge type backlight module.

The light 115 from the light-emitting element 110 enters the light guide plate 100 through the light-incident side 102 and travels in the light guide plate 100 by total internal reflection. When the light 115 reaches the dots 130 on the bottom surface 106, the total internal reflection of the light 115 is destructed by the dots 130 so that the light 115 may leave the light guide plate 100 from the light-emitting surface 104. The light 115 would then enter the components (not shown) above the backlight module 10, for example, the liquid crystal module.

When the light 115 guided by the dots 130 of the light guide plate 100 leaves the light guide plate 100, the beam angle of the light 115 may be concentrated. However, the over-concentration of the beam angle of the light 115 may reduce the luminous flux near the light-incident side 102 of the light guide plate 100. This leads to the non-uniform luminous flux on the light-emitting surface 104 of the light guide plate 100 and the dark band and the hotspot near the light-incident side 102 on the light-emitting surface 104.

In some embodiments, the light guide plate 100 may include a trumpet-shaped entry 120 near the light-incident side 102. The trumpet-shaped entry 120 increases the amount of light entering the light guide plate 100 through the light-incident side 102, which increases the luminous flux near the light-incident side 102. However, the increasing of the amount of incident light near the light-incident side 102 by the trumpet-shaped entry 120 may cause the light leakage at wide angle. In addition, the trumpet-shaped entry 120 increases the thickness of the light guide plate 100, which decreases the applicability of the light guide plate 100 in the display device.

The present disclosure provides a backlight module that may eliminate the dark band and the hotspot on the light-emitting surface near the light-incident side of the light guide plate, reduce the thickness of the light guide plate, and improve the optical performance of the backlight module.

Figure 2A:
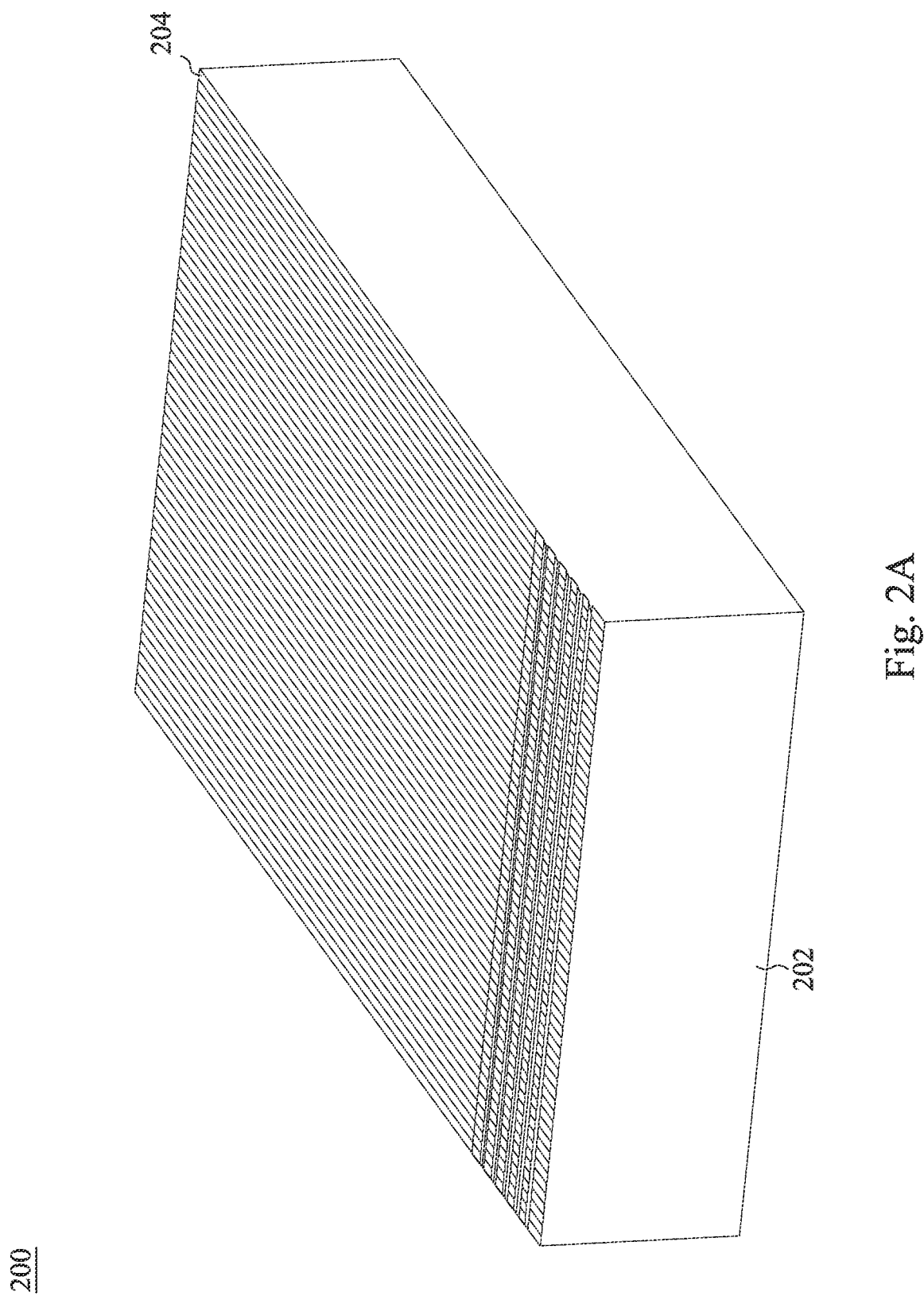
FIG. 2A illustrates a three dimensional view of a light guide plate according to some embodiments of this disclosure.
Figure 2B:
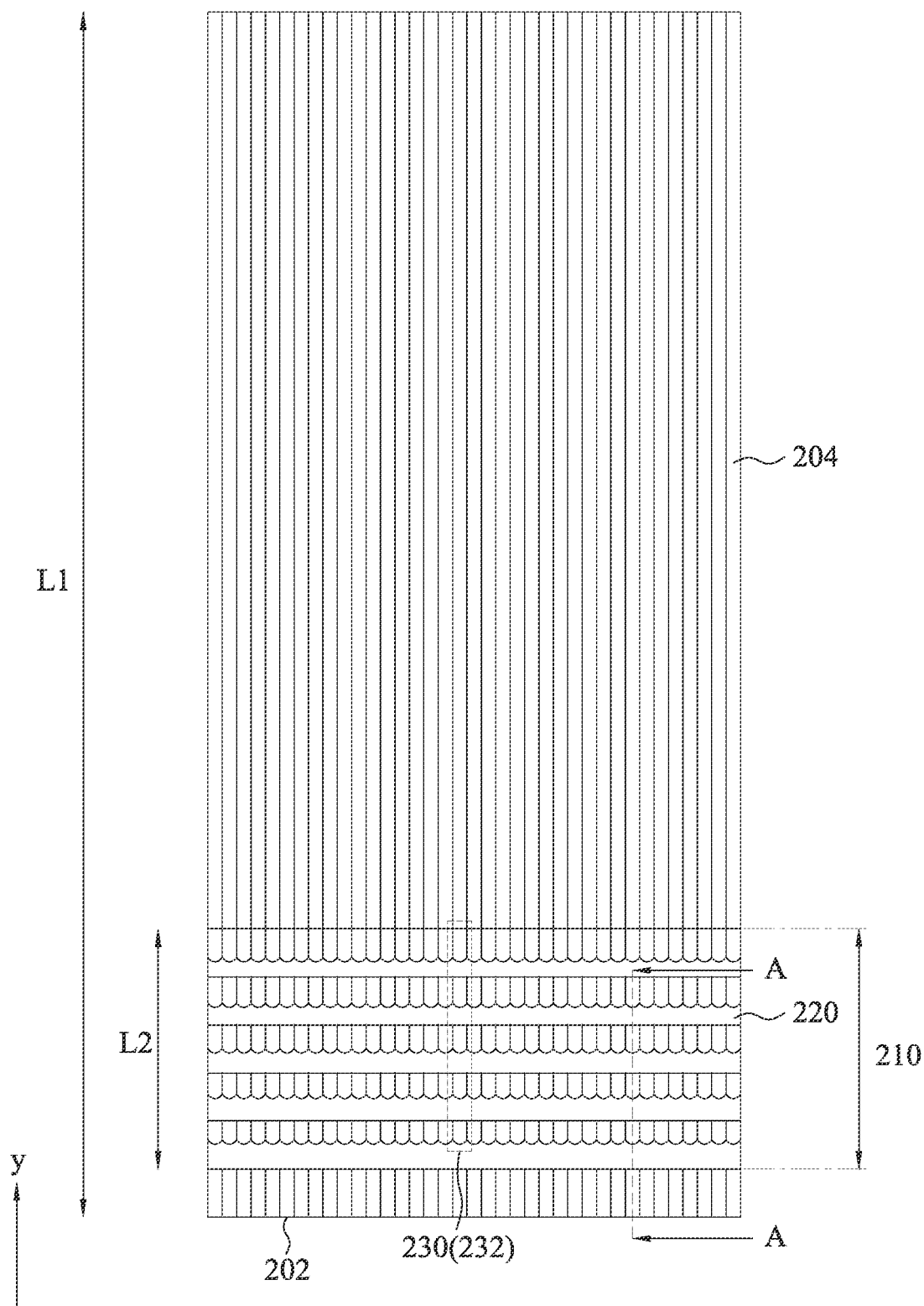
FIG. 2B illustrates a top view of the light guide plate in FIG. 2A.
Figure 2C:
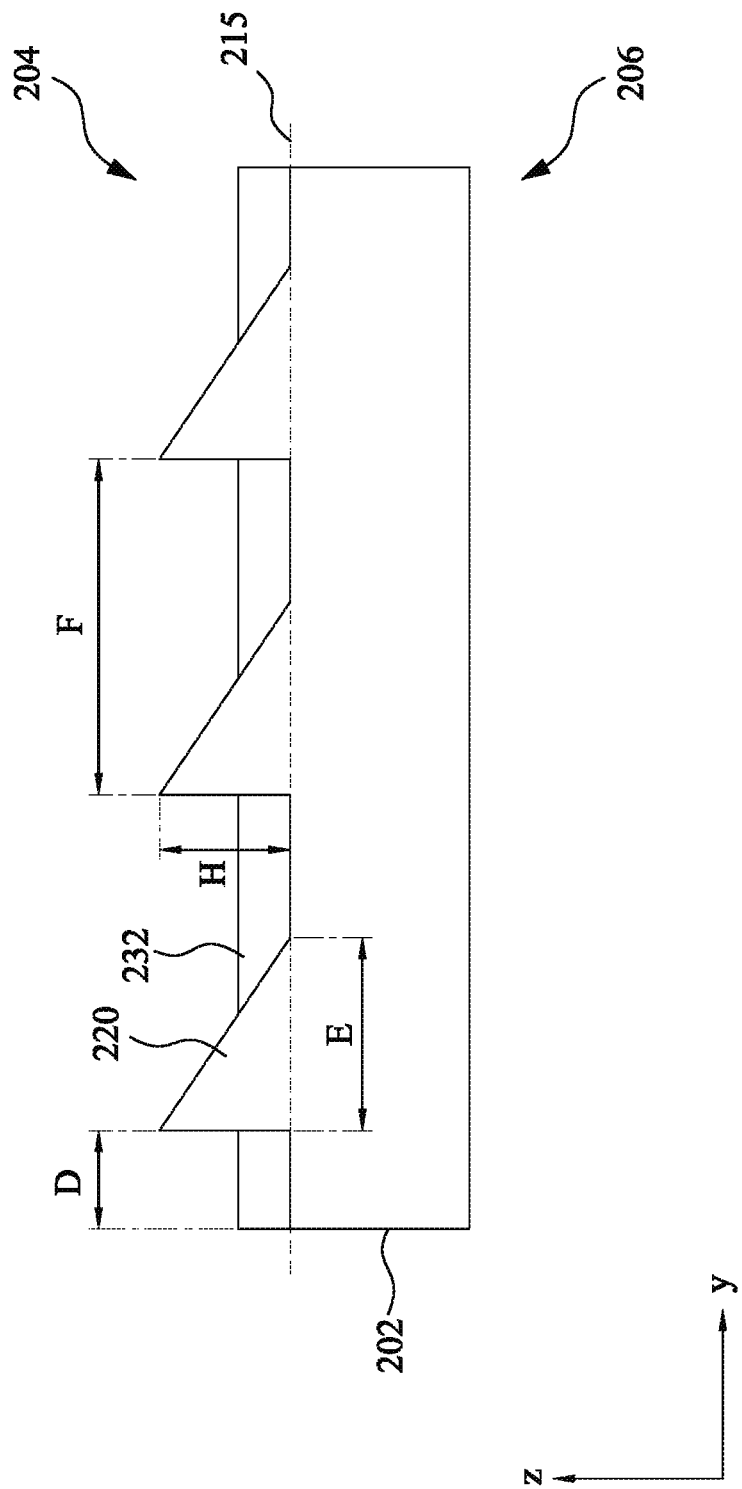
FIG. 2C illustrates a cross-sectional view of the light guide plate in FIG. 2B.

According to some embodiments of the present disclosure, FIG. 2A illustrates a three dimensional view of a light guide plate 200, FIG. 2B illustrates a top view of the light guide plate 200, and FIG. 2C illustrates a cross-sectional view of the light guide plate 200 on the x-y plane along a line A-A in FIG. 2B. In some embodiments, the backlight module 10 shown in FIG. 1 may include the light guide plate provided by the present disclosure, for example, the light guide plate 200 and the other light guide plates in the following embodiments. However, the light guide plates provided by the present disclosure should not be limited to the application in the backlight module 10.

It should be noted that, in FIG. 2B and the figures referred to the following description, the first column 220 and the first microstructure group 230 on the light guide plate 200 and the corresponding microstructures on the light guide plates in the other embodiments are illustrated in enlargement to describe the relative positions or sizes of the elements. The practical sizes and positions of the elements in the present disclosure should not be limited by the figures.

As shown in FIG. 2A to FIG. 2C, the light guide plate 200 may include a light-emitting surface 204, a bottom surface 206, and a light-incident side 202. The bottom surface 206 is opposite to the light-emitting surface 204, and the light-incident side 202 connects the light-emitting surface 204 and the bottom surface 206. In some embodiments, the light-emitting elements may be disposed at the light-incident side 202 along the x axis direction so that the light may enter the light guide plate 200 through the light-incident side 202 and leave the light guide plate 200 from the light-emitting surface 204.

The light-emitting surface 204 of the light guide plate 200 may include a first region 210 near the light-incident side 202, in which the light guide plate 200 also includes the region of the light-emitting surface 204 apart from the first region 210. In some embodiments, a ratio of a length L2 of the first region 210 along the y axis direction and a length L1 of the light-emitting surface 204 along they axis direction may be in a range of 0.1% to 10%.

In some embodiments, the y axis direction may be perpendicular to the x axis direction as shown in FIG. 2B, but the present disclosure should not be limited to the figures. In some other embodiments, the angle between the y axis direction and the x axis direction may be different from 90°.

The light-emitting surface 204 may include a plurality of first columns 220 and a plurality of first microstructure groups 230 in the first region 210. In some embodiments, as shown in FIG. 2B, the first columns 220 and the first microstructure groups 230 may be disposed in the first region 210 near the light-incident side 202 and free from being disposed in the region apart from the first region 210 on the light-emitting surface 204.

In some embodiments, referring to FIG. 2B and FIG. 2C, the first column 220 may extend along the x axis direction. In other words, the ridge of the first column 220 is parallel to the x axis direction. The plurality of the first columns 220 are arranged along the y axis direction, in which the adjacent two of the first columns 220 may be connected to each other along the y axis direction or may not be connected.

In some embodiments, each first microstructure group 230 may include a plurality of first microstructures 232 along the y axis direction, in which each first microstructure 232 connects the adjacent two of the first columns 220. In other words, the first microstructures 232 may be included between two first columns 220, and the first column 220 may be included between two first microstructures 232 of the first microstructure group 230. It should be understood that FIG. 2B and FIG. 2C only exemplarily illustrate the number of the first columns 220 and the first microstructure groups 230, and that the light guide plate 200 may include other numbers of the first columns 220 and the first microstructure groups 230.

When the light is provided to the light guide plate 200 by the light-emitting elements, the first columns 220 and the first microstructure groups 230 form a nonplanar surface with trenches on the light-emitting surface 204 near the light-incident side 202. This adjusts the luminous intensity and the position of the light leaving the light guide plate 200, which increases the luminous flux of the light guide plate 200 near the light-incident side 202 and decreases the difference between the luminous flux near the light-incident side 202 and the luminous flux away from the light-incident side 202. Therefore, the luminous flux of the light-emitting surface 204 may be uniformed, the dark band and the hotspot on the light-emitting surface 204 of the light guide plate 200 may be eliminated, and the optical performance of the backlight module with the light guide plate 200 may be improved.

In addition, the requirement of the trumpet-shaped entry, such as the trumpet-shaped entry 120 in FIG. 1, in the light guide plate 200 may be reduced because the luminous flux of the light-emitting surface 204 is uniformed by the first columns 220 and the first microstructure groups 230. Therefore, the thickness of the light guide plate 200 may be reduced.

As shown in FIG. 2C, according to the design of the light guide plate 200, the sizes and the positions of the first column 220 and the first microstructure 232 may be suitable to provide appropriate scattering effect. The following description would further describe the first column 220 and the first microstructure 232 in detail. However, it should be understood that the ranges of the sizes and the positions of the first column 220 and the first microstructure 232 may be different from those of the following description according to other embodiments of the light guide plate 200.

In some embodiments, the first column 220 may have a width E along the y axis direction. As shown in FIG. 2C, the width E is the width of the first column 220 at the reference line 215, in which the reference line 215 extends along the y axis direction and connects the valley lines between the first columns 220. In some embodiments, the width E may be in a range of 0.01 mm to 1 mm.

In some embodiments, the adjacent two of the first columns 220 may have an interval F between those first columns 220 along the y axis direction. As shown in FIG. 2C, the interval F is the distance between the ridges of the two first columns 220. In some embodiments, the interval F may be in a range of 0.001 mm to 3 mm.

It should be noted that the interval F affects the width of the first microstructure 232 along the y axis direction between the two first columns 220. For example, the width of the first microstructure 232 along the y axis direction would be greater while the interval F is greater.

In some embodiments, the first column 220 may have a height H along the z axis direction. As shown in FIG. 2C, the height H is the height from the ridge of the first column 220 to the reference line 215. In other words, the height H is the height from the top end of the first column 220 to the reference line 215. In some embodiments, the height H may be in a range of 0.001 mm to 0.15 mm.

In some embodiments, a distance D may be included between the first region 210 and the light-incident side 202. As shown in FIG. 2C, the distance D is the distance between the first column 220 nearest to the light-incident side 202 in the first region 210 and the light-incident side 202. In some embodiments, the distance D may be no greater than 3 mm. In other words, the distance D may be in a range of 0 mm to 3 mm.

In some embodiments, the first microstructure 232 of the first microstructure group 230 may include a triangular microstructure with the round angle at its top end, as shown in FIG. 2B. In some other embodiments, the first microstructure 232 may include the microstructure with other shapes.

In some embodiments, a cross-sectional area on the y-z plane of the first column 220 may substantially be a triangular area, as shown in FIG. 2C. The two side surfaces of the first column 220 collectively form the ridge of the first column 220, and one of the two side surfaces of the first column 220 may be perpendicular to the reference line 215. In some other embodiments, the first column 220 may include the side surfaces with a non-vertical angle between the side surface and the reference line 215.

Figure 3A:
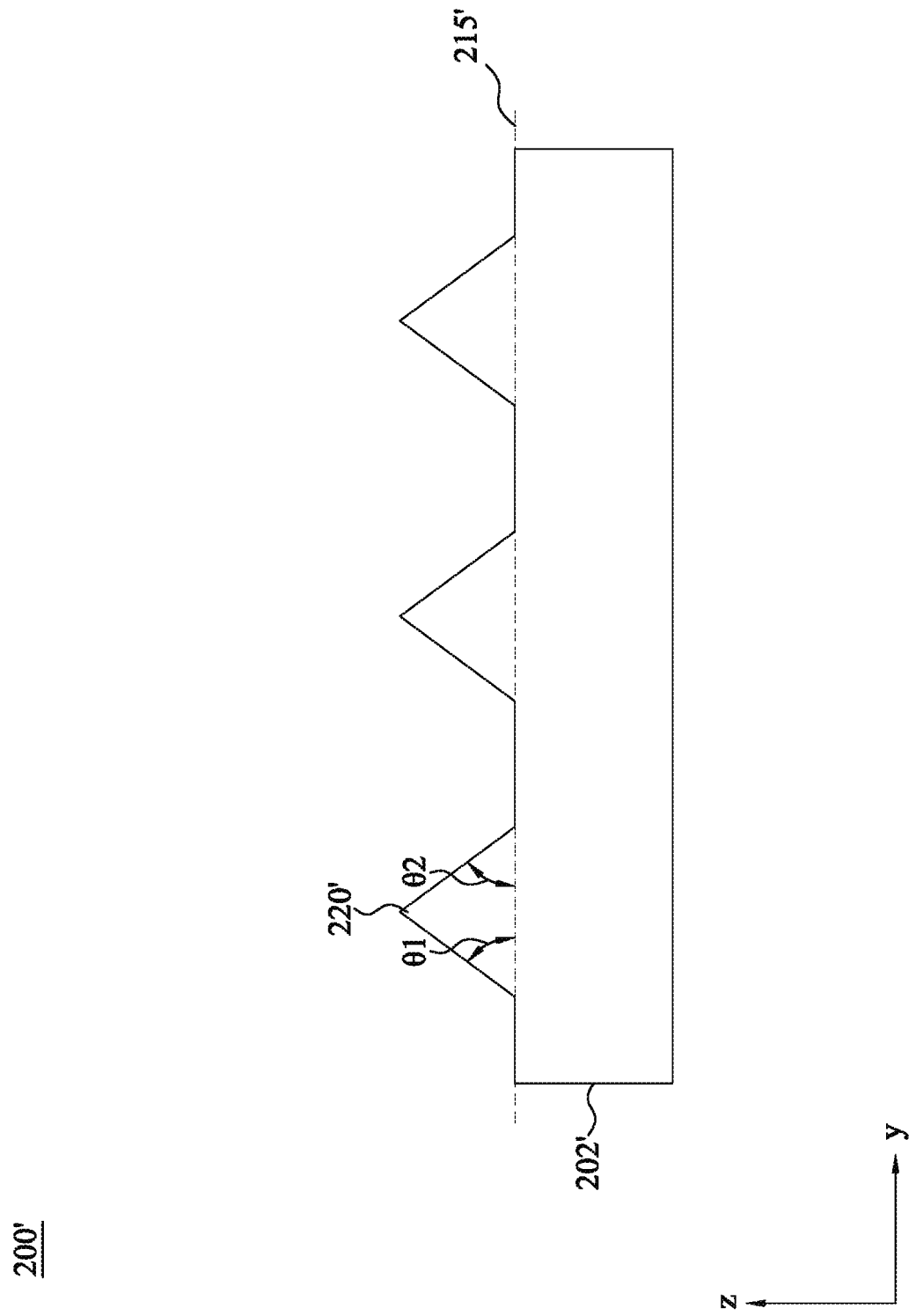
FIGS. 3A-3B illustrate cross-sectional views of the light guide plates according to some other embodiments of this disclosure.

According to some embodiments of the present disclosure, FIG. 3A illustrates a cross-sectional view of a light guide plate 200' on the y-z plane, in which the cross-sectional position is the same as the line A-A in FIG. 2B. As shown in FIG. 3A, the first column 220' of the light guide plate 200' may include two side surfaces forming the ridge of the first column 220'. An angle θ1 is defined between the side surface closer to the light-incident side 202' and the reference line 215' while an angle θ2 is defined between the side surface farther from the light-incident side 202' and the reference line 215', in which the reference line 215' extends along the y axis direction and connects the valley lines between the first columns 220'. In some embodiments, the angle θ1 may be greater than the angle θ2 to provide appropriate scattering effect relative to the light-incident side 202' of the light guide plate 200'. In some embodiments, the angle θ1 may be in a range of 75° to 90°, while the angle θ2 may be in a range of 1° to 15°.

In some embodiments, as shown in FIG. 2C, the sizes of the plurality of first columns 220 and the plurality of first microstructures 232 of the light guide plate 200 may be the same, such as the width E, the interval F, or the height H. In some other embodiments, the sizes of the first columns 220 and the first microstructures 232 may change corresponding to their positions on the light-emitting surface 204, which provide appropriate scattering effect for the positions relative to the light-incident side 202.

Figure 3B:
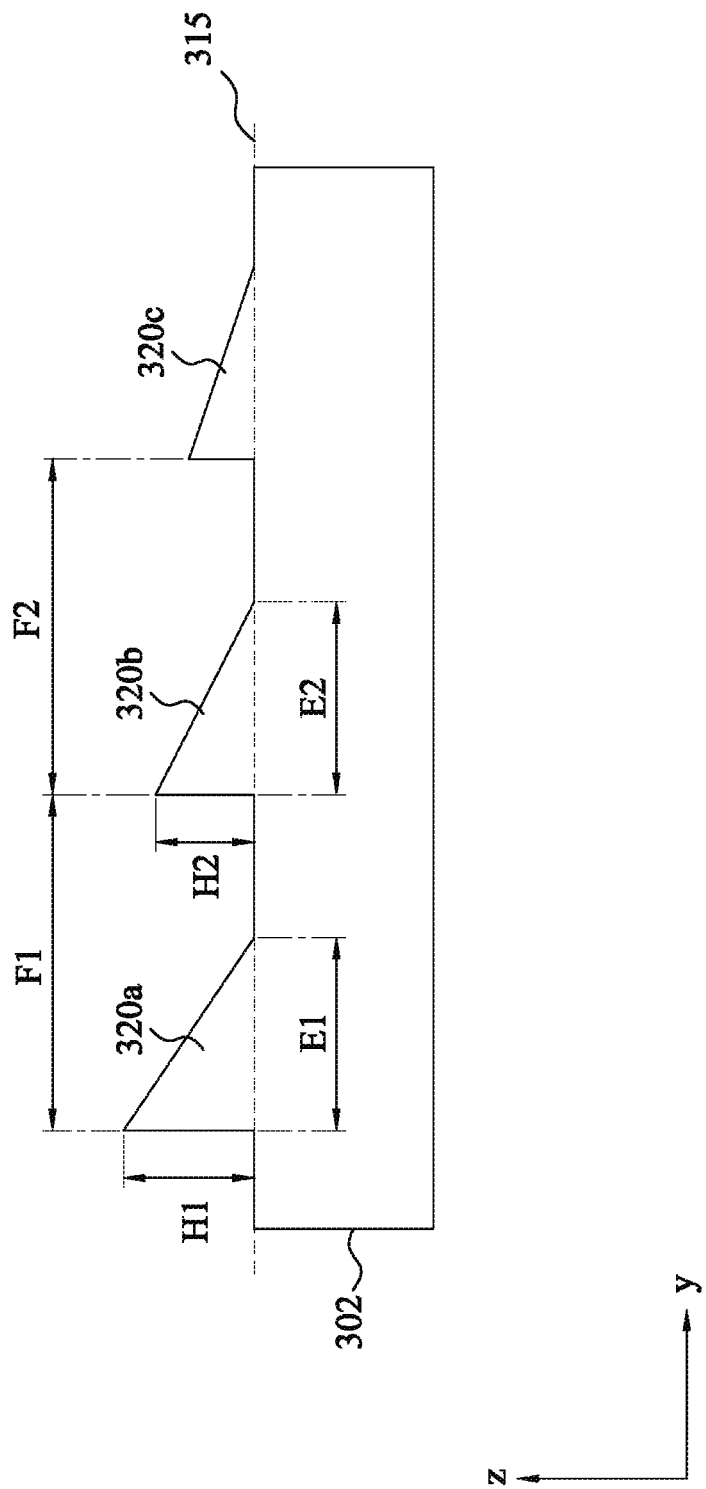

According to some other embodiments of the present disclosure, FIG. 3B illustrates a cross-sectional view of a light guide plate 300 on the y-z plane, in which the cross-sectional position is the same as the line A-A in FIG. 2B. In some embodiments, as shown in FIG. 3B, a width E2 of the first column 320b farther from the light-incident side 302 may be greater than a width E1 of the first column 320a closer to the light-incident side 302 on the light guide plate 300. It should be understood that the width E1 and the width E2 may be in the range of the width E in FIG. 2C.

In some embodiments, an interval F2 between the first column 320b and the adjacent first column 320c farther from the light-incident side 302 may be greater than an interval F1 between the first column 320b and the adjacent first column 320a closer to the light-incident side 302 on the light guide plate 300. It should be understood that the interval F1 and the interval F2 may be in the range of the interval F in FIG. 2C.

In some embodiments, a height H2 from the ridge of the first column 320b farther from the light-incident side 302 to the reference line 315 may be smaller than a height H1 from the ridge of the first column 320a closer to the light-incident side 302 to the reference line 315 on the light guide plate 300. The reference line 315 extends along the y axis direction and connects the valley lines between the first column 320a and the first column 320c. It should be understood that the height H1 and the height H2 may be in the range of the interval F in FIG. 2C.

Figure 4A:
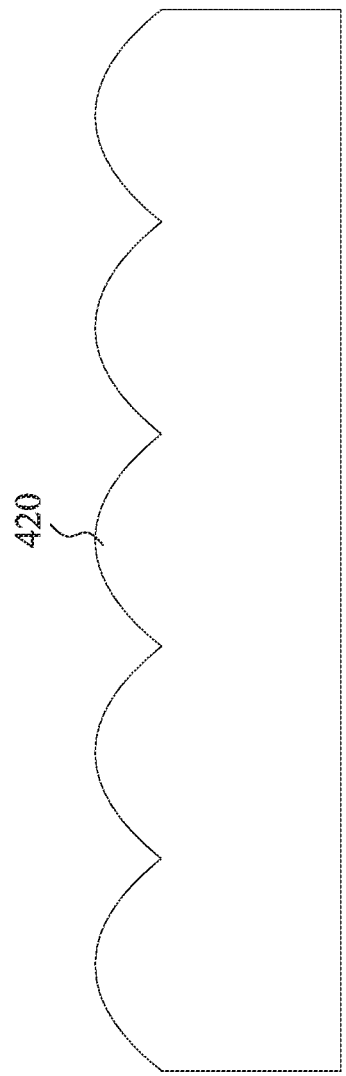
Figure 4B:
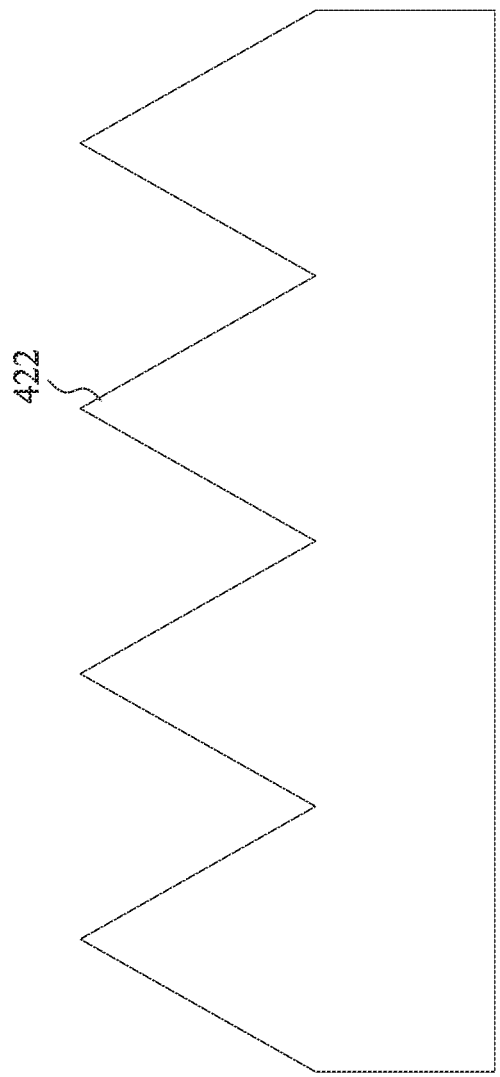
Figure 4D:
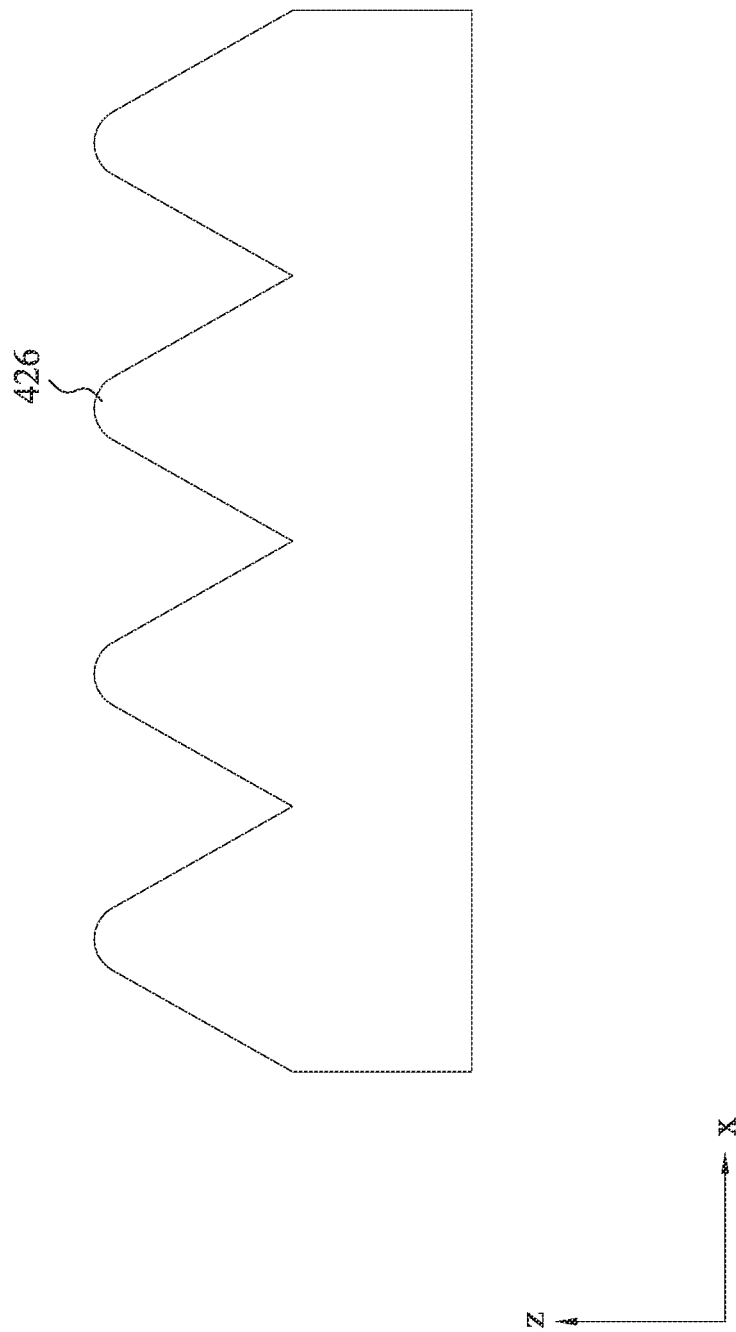

According to some embodiments of the present disclosure, FIGS. 4A-4D respectively illustrates a cross-sectional view on the x-z plane of a light guide plate 400, a light guide plate 402, a light guide plate 404, and a light guide plate 406, in which the shapes of the first microstructures on the light guide plate are enlarged. In FIG. 4A, the light guide plate 400 includes the curved first microstructures 420. In FIG. 4B, the light guide plate 402 includes the triangular first microstructures 422 made by V-cut. In FIG. 4C, the light guide plate 404 includes the trapezoid first microstructures 424. In FIG. 4D, the light guide plate 406 includes the triangular first microstructures 426 with curved round angle made by V-cut. FIGS. 4A-4D only exemplarily illustrate the shapes of the microstructures on the light guide plate, and other shapes of the microstructures are fully intended to be included within the scope of the present disclosure.

Figure 5:
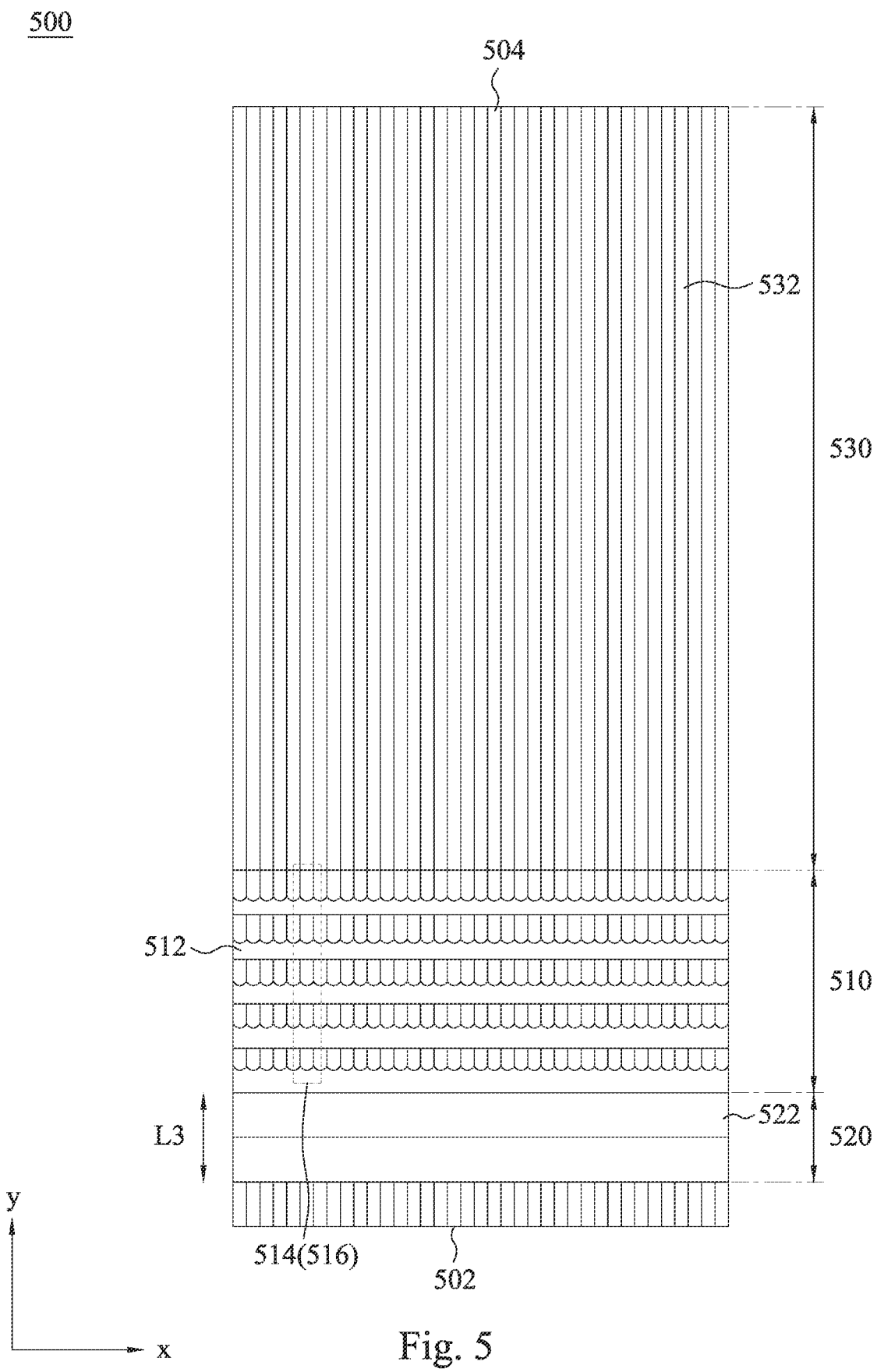
FIG. 5 illustrates a top view of a backlight module according to some embodiments of this disclosure.

According to some embodiments of the present disclosure, FIG. 5 illustrates a top view of a light guide plate 500. In some embodiments, the light-emitting surface 504 of the light guide plate 500 may include a first region 510 and a second region 520, the first region 510 and the second region 520 are arranged along the y axis direction, and the second region 520 is between the light-incident side 502 and the first region 510.

In some embodiments, the length L3 of the second region 520 along the y axis direction may be no greater than 10% of the total length of the light guide plate 500 along the y axis direction. In some embodiments, the distance between the second region 520 and the light-incident side 502 may be no greater than 3 mm.

In FIG. 5, the first region 510 includes a plurality of first columns 512 and a plurality of first microstructure groups 514, and a plurality of first microstructures 516 are included in each first microstructure group 514. The first columns 512 and the first microstructure groups 514 are similar to the first columns 220 and the first microstructure groups 230 in FIG. 2B, thus the details are not repeated.

In some embodiments, the second region 520 may include a plurality of second columns 522 extending along the x axis direction, in which the second columns 522 may be arranged alone the y axis direction. FIG. 5 only exemplarily illustrates the number of the second columns 522, and the light guide plate 500 may include other numbers of the second columns 522.

In some embodiments, the shape or the size of the second column 522 may be different from the first column 512. For example, a cross-sectional area on the x-z plane of the second column 522 may be different from that of the first column 512 (such as a trapezoid cross-sectional area), or the width of the second column 522 along the y axis direction may be greater than the width of the first column 512. In some embodiments, the height (not shown) of the second column 522 may be greater than the height of the first column 512.

When the light is provided to the light guide plate 500 by the light-emitting elements, the first columns 512, the first microstructure groups 514, and the second columns 522 form a nonplanar surface with trenches on the light-emitting surface 504 near the light-incident side 502. This adjusts the luminous intensity and the position of the light leaving the light guide plate 500, which increases the luminous flux of the light guide plate 500 near the light-incident side 502 and decreases the difference between the luminous flux near the light-incident side 502 and the luminous flux away from the light-incident side 502. Therefore, the luminous flux of the light-emitting surface 504 may be uniformed, the dark band and the hotspot on the light-emitting surface 504 of the light guide plate 500 may be eliminated, and the optical performance of the backlight module with the light guide plate 500 may be improved.

In some embodiments, the light-emitting surface 504 of the light guide plate 500 may include a first region 510 and a third region 530, as shown in FIG. 5. The first region 510 and the third region 530 are arranged along they axis direction, and the first region 510 is between the third region 530 and the light-incident side 502.

In some embodiments, the third region 530 may include a plurality of scattering structures 532 extending along the y axis direction, and each scattering structure 532 may be arranged along the y axis direction with the corresponding first microstructure group 514. In some embodiments, the shape of the scattering structure 532 may be similar to that of the first microstructure 516. For example, the microstructure shape of the scattering structure 532 and the first microstructure 516 may both be triangular.

In some embodiments, the first columns 512 and the first microstructure groups 514 may be disposed in the first region 510 closer to the light-incident side 502 and free from being disposed in the third region 530 farther from the light-incident side 502.

Figure 6:
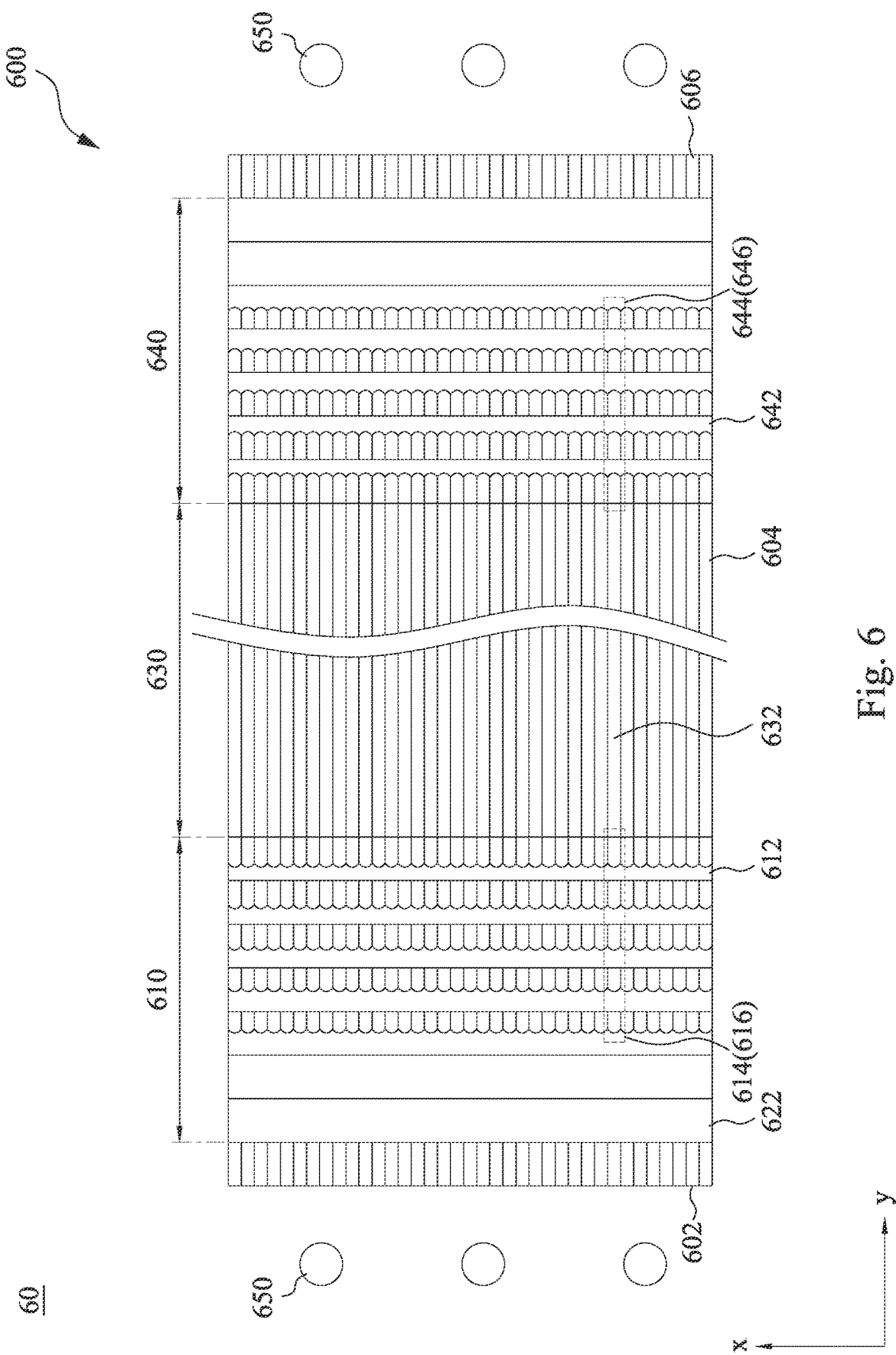
FIG. 6 illustrates a top view of a backlight module according to some embodiments of this disclosure.

According to some embodiments of the present disclosure, FIG. 6 illustrates a three dimensional view of a backlight module 60. The backlight module 60 is similar to the backlight module 10 in FIG. 1, and only the light guide plate 600 and the light-emitting element 650 of the backlight module 60 are illustrated for the following detailed description.

In the backlight module 60, the light guide plate 600 includes a light-emitting surface 604, a first light-incident side 602 at the side of the light guide plate 600, and a second light-incident side 606 opposite to the first light-incident side 602. The first light-incident side 602 and the second light-incident side 606 collectively connect the light-emitting surface 604 and the bottom surface (not shown) of the light guide plate 600. The backlight module 60 also includes a plurality of light-emitting elements 650, and the light-emitting elements 650 are disposed at the first light-incident side 602 and the second light-incident side 606 along the x axis direction.

In some embodiments, the light-emitting surface 604 may include a first region 610, a second region 630, and a third region 640, in which the first region 610, the second region 630, and the third region 640 are arranged along the y axis direction. The first region 610 is near the first light-incident side 602, the third region 640 is near the second light-incident side 606, and the second region 630 is disposed between the first region 610 and the third region 640.

The first region 610 may include a plurality of first columns 612 and first microstructure groups 614 similar to the first columns 512 and the first microstructure groups 514. For example, the first column 612 extends along the x axis direction, and the first microstructure group 614 includes a plurality of first microstructures 616 arranged along the y axis direction. In some embodiments, the first columns 612 and the first microstructure groups 614 may be disposed in the first region 610 and free from being disposed in the second region 630 at the middle portion of the light-emitting surface 604.

The third region 640 may include a plurality of third columns 642 and second microstructure groups 644 similar to the first columns 512 and the first microstructure groups 514. For example, the third column 642 extends along the x axis direction, and the second microstructure group 644 includes a plurality of second microstructures 646 arranged along the y axis direction. In some embodiments, the third columns 642 and the second microstructure groups 644 may be disposed in the third region 640 and free from being disposed in the second region 630 at the middle portion of the light-emitting surface 604.

In some embodiments, the first region 610 and the third region 640 may include the second columns 622 similar to the second columns 522 in FIG. 5. As shown in FIG. 6, the second columns 622 compared to the first columns 612 in the first region 610 are closer to the first light-incident side 602, and the second columns 622 compared to the third columns 642 in the third region 640 are closer to the second light-incident side 606.

In some embodiments, the second region 630 may include a plurality of scattering structures 632 similar to the scattering structures 532 extending along the y axis direction in FIG. 5, thus the details are not repeated.

The microstructures of the first region 610 and the third region 640 form a nonplanar surface with trenches on the light-emitting surface 604 near the first light-incident side 602 and the second light-incident side 606. This adjusts the luminous intensity and the position of the light leaving the light guide plate 600, which increases the luminous flux of the light guide plate 600 near the first light-incident side 602 and the second light-incident side 606. Therefore, the luminous flux of the light-emitting surface 604 may be uniformed, and the dark band and the hotspot on the light-emitting surface 604 of the light guide plate 600 may be eliminated.

According to some embodiments of the present disclosure, FIGS. 7A-7E illustrate cross-sectional views of forming a light guide plate 706 at fabrication stages. It should be understood, other processes may be included before, during, and after the processes illustrated in FIGS. 7A-7E, and the numbers of the components in FIGS. 7A-7E are exemplary. Other numbers of the processes and the components may be included in other embodiments. For example, the light guide plate 706 in FIG. 7E includes a first region, a second region, and a third region similar to the first region 510, the second region 520, and the third region 530 of the light guide plate 500 mentioned above, but the light guide plate 706 in other embodiments may include a third region similar to the third region 640 of the light guide plate 600 mentioned above.

Figure 7A:
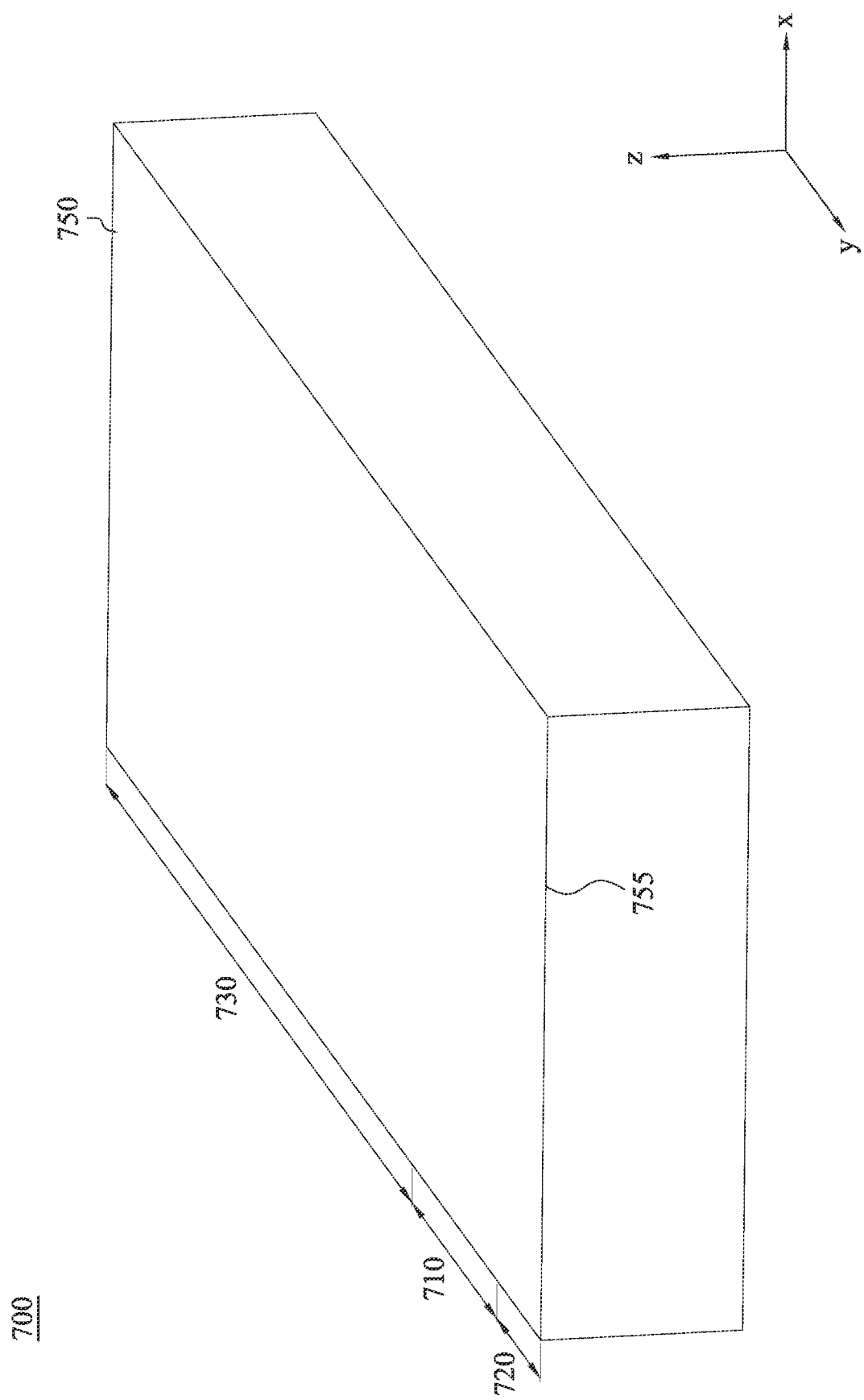
Figure 7B:
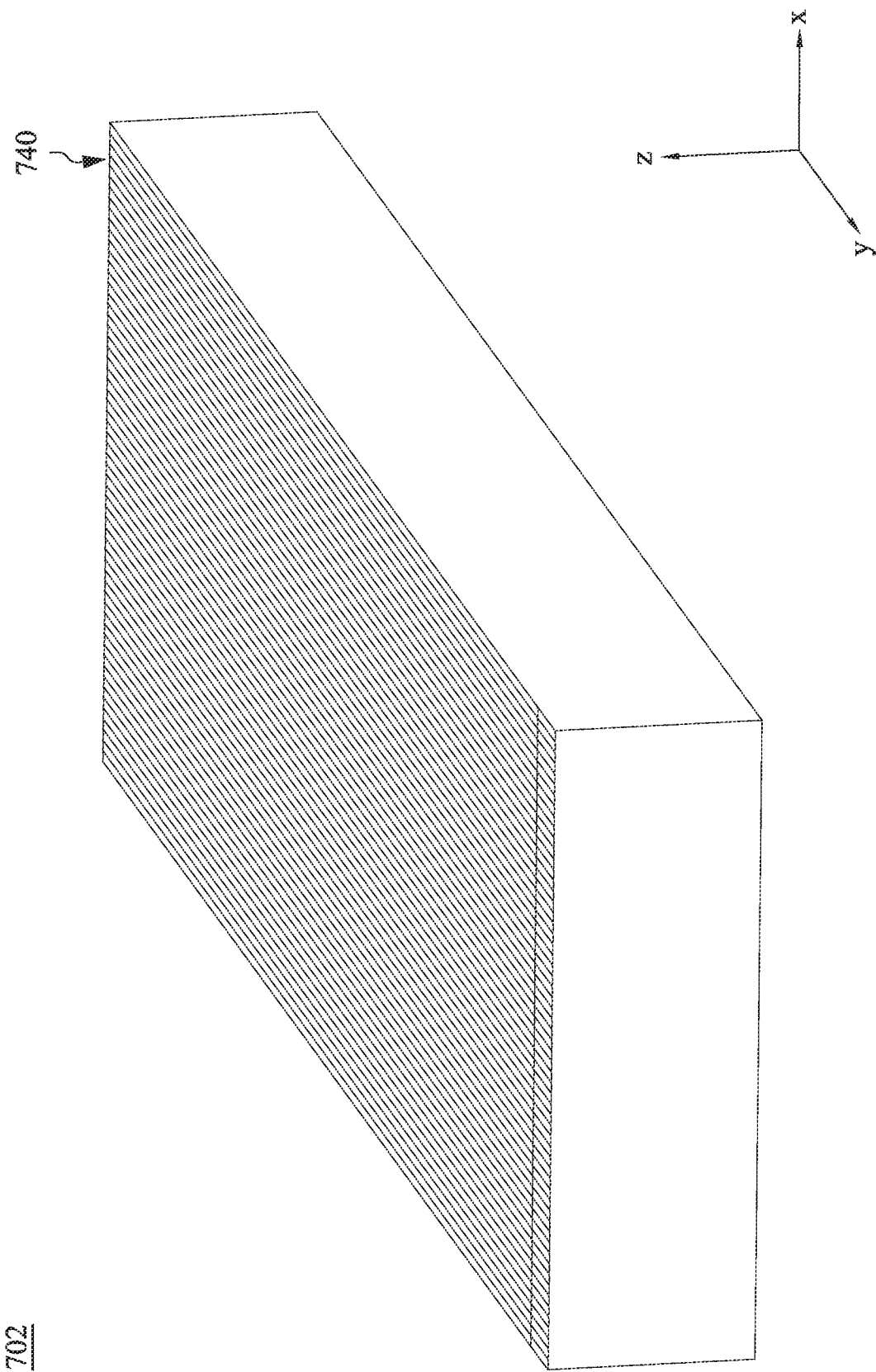
Figure 7C:
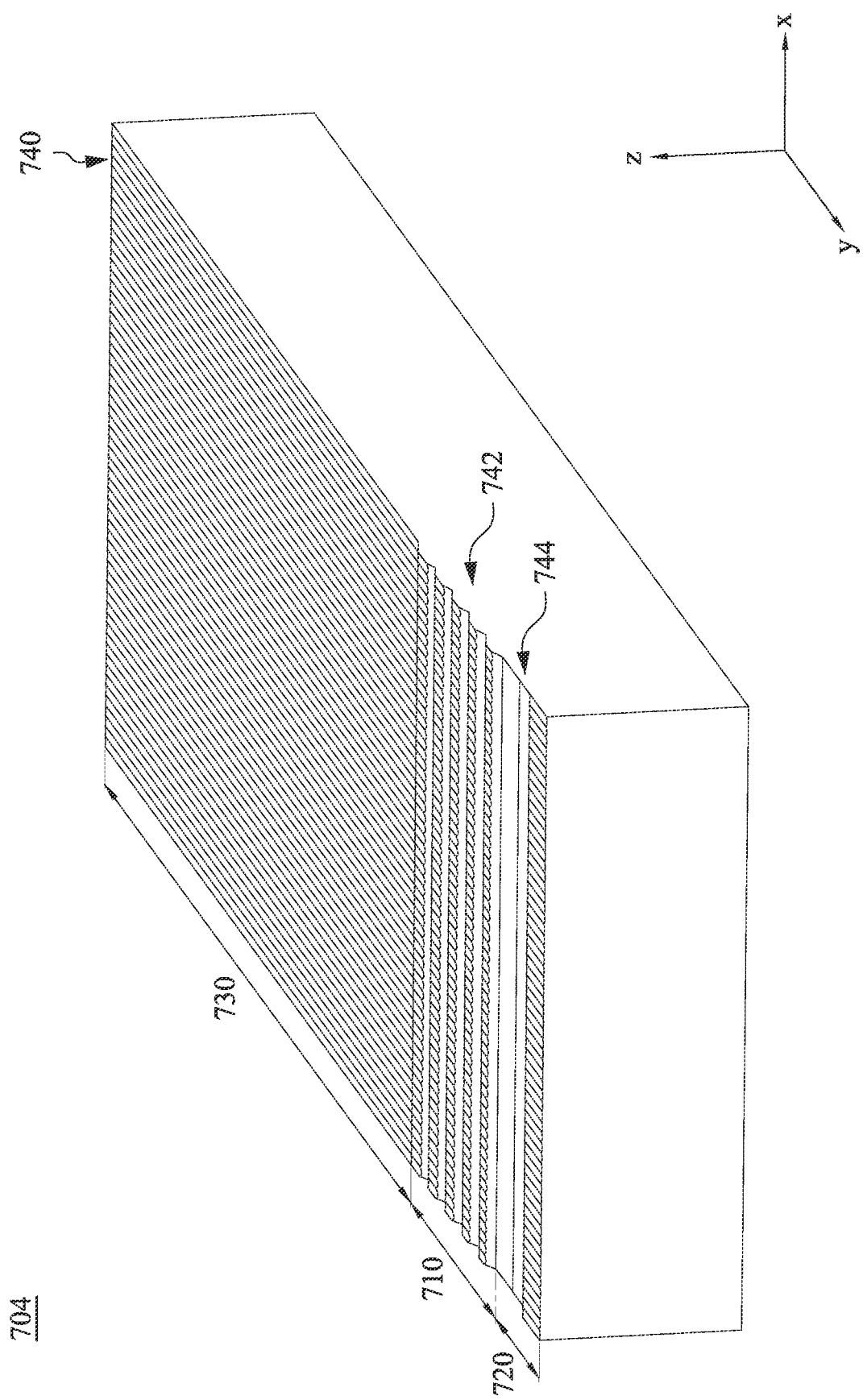
Figure 7E:
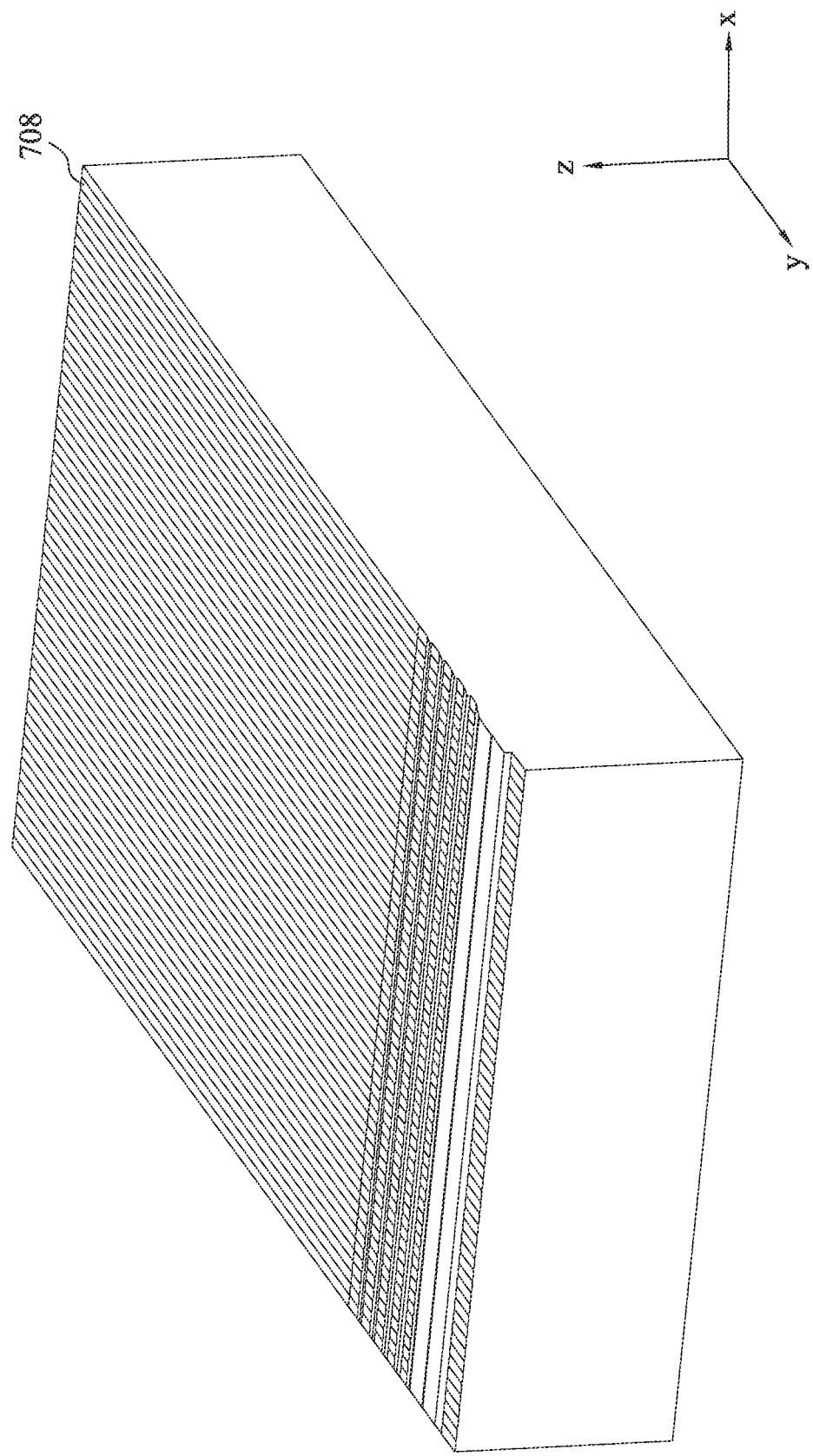

In FIG. 7A, a substrate 700 is provided as a substrate for the following processing fabrication to form the mold for the light guide plate 706 (as shown in FIG. 7E). The substrate 700 includes a processing plane 750 which may be formed into the later described structures by the processing tools in the following processes. For example, the structures on the processing plane 750 may be formed by the processing cutter.

In some embodiments, the processing plane 750 may include a first processing region 710, a second processing region 720, and a third processing region 730, in which the first processing region 710, the second processing region 720, and the third processing region 730 may be arranged along the y axis direction. The first processing region 710 may be closer to the first edge 755 of the processing plane 750 compared to the third processing region 730.

In some embodiments, the first processing region 710 may be between the second processing region 720 and the third processing region 730. The distance between the second processing region 720 and the first edge 755 may be no greater than 3 mm, and the length of the second processing region 720 along the y axis direction may be no greater than 10% of the total length of the processing plane 750 along the y axis direction.

In some other embodiments, the processing plane 750 may include the first processing region 710 and the third processing region 730, but without the second processing region 720. The distance between the first processing region 710 and the first edge 755 may be no greater than 3 mm.

In FIG. 7B, the substrate 702 is formed. A plurality of first mold trenches 740 extending along the y axis direction are formed on the processing plane 750 of the substrate 700 in FIG. 7A by the processing cutter with a profile similar to the above mentioned first microstructure 516. In some embodiments, the first mold trenches may be connected to each other.

In FIG. 7C, the substrate 704 is formed. A plurality of second mold trenches 742 in the first processing region 710 are formed on the substrate 702 in FIG. 7B by the processing cutter with a profile similar to the above mentioned first column 512. In some embodiments, the second mold trenches 742 may be formed in the first processing region 710 and free from being formed in the third processing region 730.

In some embodiments, the second mold trenches 742 may correspond to the first columns 512 of the light guide plate 500 in FIG. 5, and the first mold trench 740 between the adjacent two of the second mold trenches 742 may correspond to the first microstructure group 514 of the light guide plate 500 in FIG. 5. In some embodiments, for example, the width of the second mold trench 742 along the y axis direction may be in a range of 0.01 mm to 1 mm. In some embodiments, the interval between the valley lines, which are formed by the relative low points of the second mold trenches 742, of the adjacent two of the second mold trenches 742 may be in a range of 0.001 mm to 3 mm. In some embodiments, the depth of the second mold trenches 742 along the z axis direction may be in a range of 0.001 mm to 0.15 mm.

In some embodiments, after forming the second mold trenches 742, the third mold trenches 744 may be formed in the second processing region 720, and portions of the first mold trenches 740 in the second processing region 720 may be removed. In some embodiments, the third mold trenches 744 may be formed in the second processing region 720 by the processing cutter that forms the second mold trenches 742. In some embodiments, the third mold trenches 744 may correspond to the second columns 522 of the light guide plate 500 in FIG. 5. For example, the depth of the third mold trench 744 may be greater than that of the second mold trench 742.

In some embodiments, the first processing region 710, the third processing region 730, and the fourth processing region (not shown) may be arranged sequentially along the y axis direction on the processing plane 750 of the substrate 700. Specifically, the first processing region 710 is near the first edge 755, the fourth processing region is near the second edge (not shown) opposite to the first edge 755, and the third processing region 730 is disposed between the first processing region 710 and the fourth processing region. The fourth processing region is similar to the first processing region 710. In other words, the first processing region 710 and the fourth processing region may both include the second mold trenches 742 while the second mold trenches 742 may be free from being formed in the third processing region 730.

In FIG. 7D-7E, the processed substrate 704 is used as the mold to form a light-emitting surface 708 of the light guide plate 706 by rolling over with the processing plane. The light-emitting surface 708 of the light guide plate 706 includes the structures formed from the first mold trenches 740, the second mold trenches 742, and the third mold trenches 744. The structures are disposed near the light-incident side of the light-emitting surface 708 formed by rolling over, which uniforms the luminous flux of the light-emitting surface 708 of the light guide plate 706 and eliminates the dark band and the of the light guide plate 706.

In the backlight module disclosed in the present disclosure, the light guide plate includes an upper surface structure near the light-incident side. The upper surface structure includes the trenches formed by the columns and the microstructures that may adjust the luminous intensity, the light angle, and the luminous position of the partial light guide plate, which may reduce the difference between the luminous flux near the light-incident side and the luminous flux away from the light-incident side. Therefore, the luminous flux of the light guide plate is uniformed, and the dark band and the hotspot are eliminated. The sizes of the columns and the microstructures of the light guide plate may show variation with their positions to further uniform the light leaving the backlight module. The dark band and the hotspot of the light guide plate may be eliminated by the upper surface structure so that the thickness of the light guide plate may be reduced because of the design without the structures, such as the trumpet-shaped entry, increasing the thickness of the light guide plate.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A backlight module, comprising:
   a plurality of first light-emitting elements; and
   a light guide plate, comprising:
      a light-emitting surface;
      a bottom surface opposite to the light-emitting surface;
      a first light-incident side connecting the light-emitting surface and the bottom surface, wherein the first light-emitting elements are disposed at the first light-incident side and arranged along a first direction, and the light-emitting surface comprises a first region near the first light-incident side;
      a plurality of first columns extending along the first direction and disposed in the first region of the light-emitting surface; and
      a plurality of first microstructure groups disposed in the first region, wherein each of the first microstructure groups comprises a plurality of first microstructures arranged along a second direction different from the first direction, and the plurality of first microstructures and the plurality of first columns are alternately arranged such that each of the first microstructures connects adjacent two of the first columns.

2. The backlight module of claim 1, wherein the light-emitting surface of the light guide plate comprises a second region between the first region and the first light-incident side, and the light guide plate comprises a plurality of second columns extending along the first direction and disposed in the second region of the light-emitting surface, wherein a height of the second columns is greater than that of the first columns.

3. The backlight module of claim 2, wherein a length of the second region along the second direction is no greater than 10% of a total length of the light guide plate along the second direction.

4. The backlight module of claim 1, wherein an interval along the second direction between ridges of the first columns is in a range of 0.001 mm to 3 mm.

5. The backlight module of claim 1, wherein the second direction is perpendicular to the first direction.

6. The backlight module of claim 1, wherein a height of the first columns is in a range of 0.001 mm to 0.15 mm.

7. The backlight module of claim 1, wherein a width of one of the first columns along the second direction is in a range of 0.01 mm to 1 mm.

8. The backlight module of claim 1, wherein a distance between the first region and the first light-incident side along the second direction is no greater than 3 mm.

9. The backlight module of claim 1, wherein the light-emitting surface of the light guide plate comprises a third region, the first region is between the third region and the first light-incident side, and the light guide plate comprises a plurality of scattering structures extending along the second direction and disposed in the third region of the light-emitting surface, wherein each of the scattering structures is arranged along the second direction with one of the first microstructure groups.

10. The backlight module of claim 1, further comprising:
    a plurality of second light-emitting elements,
    wherein the light guide plate comprises a second light-incident side opposite to the first light-incident side, a plurality of third columns and a plurality of second microstructure groups, and the light-emitting surface comprises a fourth region near the second light-incident side,
    wherein the second light-incident side connects the light-emitting surface and the bottom surface, and the second light-emitting elements are disposed at the second light-incident side along the first direction,
    wherein the third columns are disposed in the fourth region of the light-emitting surface and extends along the first direction, each of the second microstructure groups comprises a plurality of second microstructures arranged along the second direction, and each of the second microstructures connects adjacent two of the third columns.

* * * * *